United States Patent
Inoue et al.

(10) Patent No.: US 8,727,940 B2
(45) Date of Patent: May 20, 2014

(54) DEVICE FOR CONTROLLING POWER TRANSMISSION OF VEHICLE

(75) Inventors: Hiroki Inoue, Nishio (JP); Takeshige Miyazaki, Chiryu (JP)

(73) Assignee: Aisin AI Co., Ltd., Nishio-Shi (JP)

(*) Notice: Subject to any disclaimer, the term of this patent is extended or adjusted under 35 U.S.C. 154(b) by 0 days.

(21) Appl. No.: 13/994,174

(22) PCT Filed: Aug. 9, 2011

(86) PCT No.: PCT/JP2011/068108
§ 371 (c)(1),
(2), (4) Date: Jun. 14, 2013

(87) PCT Pub. No.: WO2012/081277
PCT Pub. Date: Jun. 21, 2012

(65) Prior Publication Data
US 2013/0267382 A1   Oct. 10, 2013

(30) Foreign Application Priority Data
Dec. 16, 2010  (JP) ................. 2010-280006

(51) Int. Cl.
*B60W 10/02* (2006.01)
*B60W 10/08* (2006.01)

(52) U.S. Cl.
USPC ......................... 477/5; 903/912; 903/930

(58) Field of Classification Search
USPC ........... 477/5–8, 14, 166, 174, 175; 903/912, 903/930
See application file for complete search history.

(56) References Cited

U.S. PATENT DOCUMENTS

| 2009/0149297 A1* | 6/2009 | Walser et al. | 477/125 |
| 2010/0051360 A1* | 3/2010 | Oba et al. | 180/65.22 |
| 2010/0105523 A1* | 4/2010 | Hrovat et al. | 477/175 |

FOREIGN PATENT DOCUMENTS

| JP | 2000-224710 A1 | 8/2000 |
| JP | 2001-008306 A1 | 1/2001 |
| JP | 2009-005418 A1 | 1/2009 |
| JP | 2009-292419 A1 | 12/2009 |
| JP | 2010-206893 A1 | 9/2010 |
| JP | 2010-254014 A1 | 11/2010 |

OTHER PUBLICATIONS

International Search Report and Written Opinion dated Nov. 15, 2011.

* cited by examiner

*Primary Examiner* — Justin Holmes
(74) *Attorney, Agent, or Firm* — Burr & Brown, PLLC

(57) ABSTRACT

This power transmission control device is applied to a hybrid vehicle which includes an internal combustion engine and a motor (MG) as power sources. The power transmission control device includes a manual transmission and a friction clutch. When a clutch enters a completely disengaged state as a result of operation of a clutch pedal by a driver in a state where MG torque is adjusted to regeneration torque acting in a direction for decelerating the vehicle, the magnitude of the regeneration torque is decreased to "minute value A which is greater than zero," and then maintained at the minute value A. Much energy generated as a result of regeneration can be stored in a battery (see the area shown by dots) as compared with the case where the regeneration torque is adjusted to zero immediately after the clutch enters the completely disengaged state. Accordingly, energy efficiency (fuel efficiency) is improved.

9 Claims, 3 Drawing Sheets

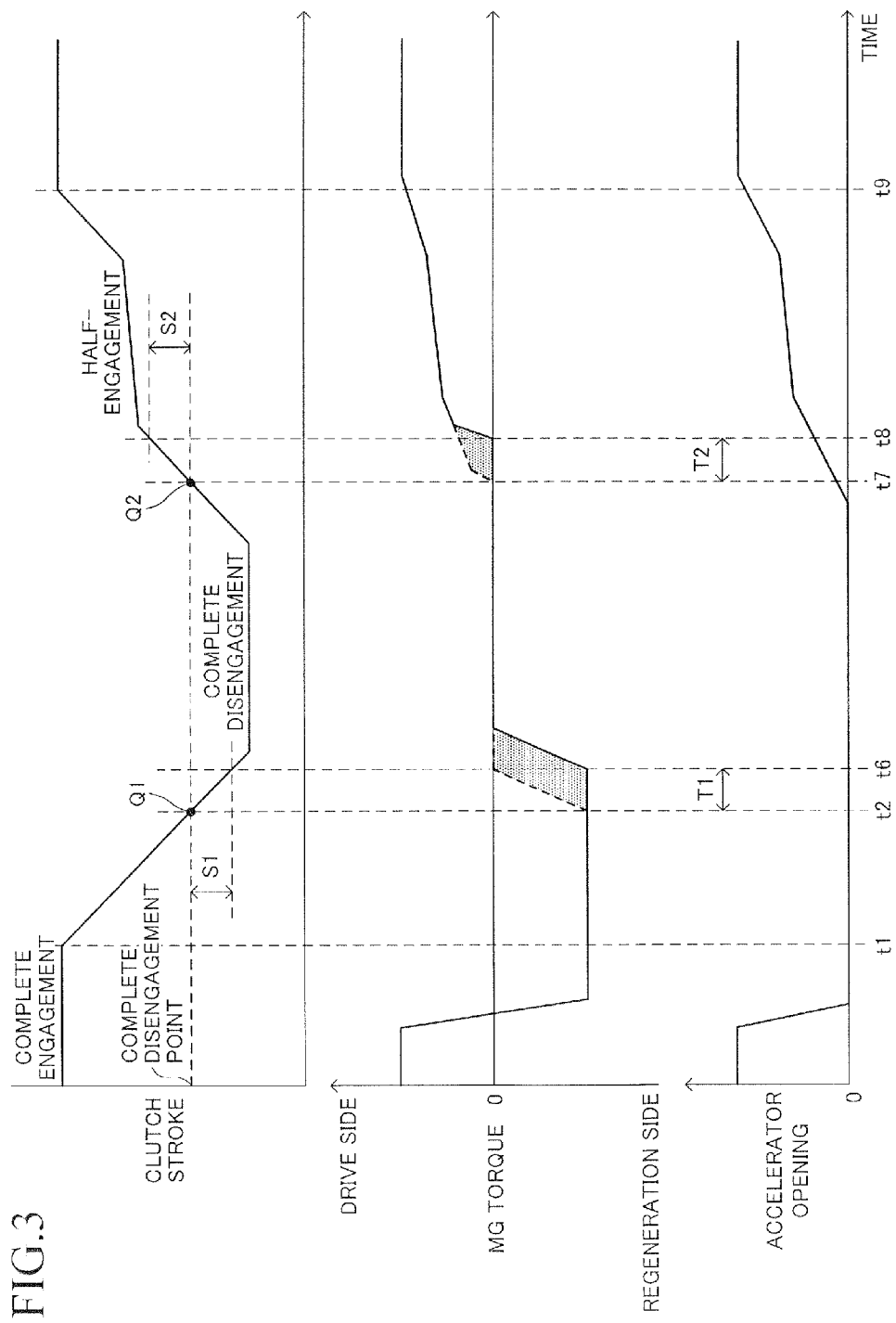

DEVICE FOR CONTROLLING POWER TRANSMISSION OF VEHICLE

TECHNICAL FIELD

The present invention relates to a power transmission control device for a vehicle, and more particularly to a power transmission control device which is applied to a vehicle having an internal combustion engine and an electric motor as power sources and which includes a manual transmission and a friction clutch.

BACKGROUND ART

Conventionally, there has been widely known a so-called hybrid vehicle which includes an engine and an electric motor (motor generator) as power sources (see, for example, Patent Document 1). In recent years, there has been developed a hybrid vehicle which includes a manual transmission and a friction clutch (hereinafter referred to as an "HV-MT vehicle"). A term "manual transmission" used herein refers to a transmission which does not include a torque converter and whose gear stage is selected in accordance with the shift position of a shift lever operated by a driver (the manual transmission may be abbreviated as MT). Also, a term "friction clutch" used herein refers to a clutch which is interposed between the output shaft of an internal combustion engine and the input shaft of the manual transmission and which is configured such that the engagement state of a friction plate changes in accordance with the operation quantity of a clutch pedal operated by the driver. Hereinafter, torque output from the output shaft of the internal combustion engine will be referred to as "internal combustion engine torque," and torque output from the output shaft of the electric motor will be referred to as "motor torque."

PRIOR ART DOCUMENT

Patent Document

Patent Document 1: Japanese Patent Application Laid-Open (kokai) No. 2000-224710

SUMMARY OF THE INVENTION

An HV-MT vehicle may employ a configuration in which the output shaft of an electric motor is connected to any one of the output shaft of an internal combustion engine, the input shaft of a transmission, and the output shaft of the transmission. Hereunder, there will be considered a configuration in which the output shaft of the electric motor is connected to the output shaft of the transmission. In this configuration, in a state in which a clutch pedal is depressed in order to perform a shift operation, etc. (more specifically, in periods during which a friction clutch is in a completely disengaged state), torque (specifically, drive torque generated in a direction for accelerating the vehicle or regeneration torque generated in a direction for decelerating the vehicle) can be transmitted to drive wheels by making use of motor torque.

In contrast, in the case of a conventionally-known vehicle (hereinafter referred to as an "ordinary MT vehicle") which includes a manual transmission and a friction clutch and which includes only an internal combustion engine as a power source, torque cannot be transmitted to the drive wheels by making use of the torque of the internal combustion engine in periods during which the friction clutch is in the completely disengaged state.

Incidentally, there has been demand to render the drive feeling of the HV-MT vehicle identical (or similar) to the drive feeling of an ordinary MT vehicle. From the viewpoint of satisfaction of this demand, conceivably, it is preferred that in the HV-MT vehicle the motor torque is adjusted to zero (the motor torque is not transmitted to the drive wheels) in periods during which the friction clutch is in the completely disengaged state.

Specifically, for example, in the case where a clutch pedal is depressed in order to start a shift operation in a state where torque (regeneration torque) is generated in the direction for decelerating the vehicle by making use of the motor torque (in the case where the friction clutch enters the completely disengaged state), conceivably, the regeneration torque is adjusted to zero immediately. In the case where the clutch pedal is released in order to end the shift operation in such a state where the regeneration torque is adjusted to zero (in the case where the friction clutch enters a state other than the completely disengaged state), conceivably, the torque (drive torque) generated in the direction for driving the vehicle by making use of the motor torque is immediately transmitted to the drive wheels.

Incidentally, while generating the regeneration torque (>0), the electric motor functions as a generator, thereby storing in a battery the energy obtained as a result of electric power generation based on the regeneration torque. Accordingly, from the viewpoint of improvement of energy efficiency (improvement of fuel efficiency), it is undesirable that the regeneration torque be returned to zero immediately after the clutch pedal is pressed (the friction clutch enters the completely disengaged state) as mentioned above.

Meanwhile, while generating the drive torque (>0), the electric motor generator functions as a motor, thereby consuming the energy stored in the battery in order to generate the drive torque. Accordingly, from the viewpoint of improvement of energy efficiency (improvement of fuel efficiency), it is undesirable that transmission of the drive torque to the drive wheels be started immediately after the clutch pedal is released (immediately after the friction clutch enters a state other than the completely disengaged state) as mentioned above. The above problems arise as a result of placement of top priority on the demand to render the drive feeling of the HV-MT vehicle the same as the drive feeling of an ordinary MT vehicle.

An object of the present invention is to provide a power transmission control device for an HV-MT vehicle which can improve energy efficiency (fuel efficiency) while satisfying the demand to render the drive feeling of the HV-MT vehicle the same as the drive feeling of an ordinary MT vehicle.

The power transmission control device for a vehicle according to the present invention is applied to a hybrid vehicle having an internal combustion engine and an electric motor as power sources. This power transmission control device includes a manual transmission, a friction clutch, and control means.

The manual transmission is a transmission which does not include a torque converter and whose gear stage is selected in accordance with the shift position of a shift operation member operated by a driver. The manual transmission has an input shaft which receives power from an output shaft of the internal combustion engine and an output shaft which outputs power to drive wheels of the vehicle. The output shaft of the electric motor is connected to the output shaft of the manual transmission.

The friction clutch is a clutch which is interposed between the output shaft of the internal combustion engine and the input shaft of the manual transmission and which is configured such that the engagement state changes in accordance with the operation quantity of a clutch operation member operated by the driver. Operation of the clutch operation member is detected by second detection means.

Control means controls torque output from the output shaft of the internal combustion engine (internal combustion engine torque) and torque output from the output shaft of the electric motor (motor torque). In the case where it is determined that a power transmission system is established between the output shaft of the internal combustion engine and the output shaft of the manual transmission, the magnitude of the motor torque is adjusted to the base motor torque which is determined on the basis of the operation quantity of the acceleration operation member. When the operation quantity of the acceleration operation member is equal to or greater than a predetermined quantity, the base motor torque is torque acting in the direction for accelerating the vehicle. When the operation quantity of the acceleration operation member is less than the predetermined quantity, the base motor torque is torque acting in the direction for decelerating the vehicle. The operation quantity of the acceleration operation member is detected by first detection means. The "case where it is determined that a power transmission system is established between the output shaft of the internal combustion engine and the output shaft of the manual transmission" refers to a state in which it is determined that the friction clutch is in a state other than the completely disengaged state (i.e., the completely engaged state or the half-engaged state) and the manual transmission is in the non-neutral state. The "non-neutral state of the manual transmission" refers to a state in which a power transmission system is established between the input and output shafts of the manual transmission.

The feature of the power transmission control device according to the present invention resides in that regeneration torque reduction control is performed upon determination that the motor torque is adjusted to the base motor torque serving as the regeneration torque and the state of the power transmission control device has changed from a state in which a power transmission system is established between the output shaft of the internal combustion engine and the output shaft of the manual transmission to a state in which the power transmission system is not established therebetween. The regeneration torque reduction control is performed such that the magnitude of the motor torque serving as the regeneration torque is decreased from the magnitude of the base motor torque to a predetermined minute value which is greater than zero, and then maintained at the minute value. Preferably, the regeneration torque reduction control is started upon determination that the motor torque is adjusted to the base motor torque serving as the regeneration torque and the friction clutch has changed its engagement state from a state other than the completely disengaged state to the completely disengaged state. The "case where it is determined that a power transmission system is not established between the output shaft of the internal combustion engine and the output shaft of the manual transmission" refers to a state in which it is determined that the friction clutch is in the completely disengaged state or the manual transmission is in the neutral state. The "neutral state of the manual transmission" refers to a state in which a power transmission system is not established between the input and output shafts of the manual transmission.

According to the present invention, in the case where the clutch pedal is pressed (in the case where the friction clutch enters the completely disengaged state) (or in the case where the manual transmission enters the neutral state), the magnitude of the regeneration torque is decreased to the non-zero "minute value which is greater than zero," and then maintained at the minute value. Accordingly, energy efficiency (fuel efficiency) is improved as compared with the case where the regeneration torque is adjusted to zero immediately after the clutch pedal is depressed as described above (after the friction clutch enters the completely disengaged state) (or after the manual transmission enters the neutral state). Moreover, drive feeling of the HV-MT vehicle becomes closer to the drive feeling of an ordinary MT vehicle as compared with the case where the regeneration torque is maintained at the base motor torque even after the clutch pedal is depressed (after the friction clutch enters the completely disengaged state) (or after the manual transmission enters the neutral state). Namely, the present invention can improve energy efficiency (fuel efficiency) while satisfying the demand to render the drive feeling of the HV-MT vehicle the same as the drive feeling of an ordinary MT vehicle.

The device according to the present invention may be configured such that the magnitude of the motor torque serving as the regeneration torque is gradually decreased from the minute value toward zero upon determination that the completely disengaged state of the friction clutch has continued for a predetermined time after start of the regeneration torque reduction control in a state in which the magnitude of the motor torque serving as the regeneration torque is maintained at the minute value as a result of performance of the regeneration torque reduction control. In addition, preferably, the minute value is set to a greater value as the shift position of the shift operation member becomes closer to the position corresponding to the lowest gear stage, the vehicle speed increases, or the operation quantity of a deceleration operation member operated by the driver in order to decelerate the vehicle increases.

Another feature of the power transmission control device according to the present invention resides in that the regeneration torque reduction control is performed such that the magnitude of the motor torque serving as the regeneration torque is maintained at the magnitude of the base motor torque for a first predetermined period, and then decreased to zero. For the same reason as that described for the above-mentioned regeneration torque reduction control, the present invention can improve energy efficiency (fuel efficiency) while satisfying the demand to render the drive feeling of the HV-MT vehicle the same as the drive feeling of an ordinary MT vehicle.

Another feature of the power transmission control device according to the present invention reside in that motor torque return control is performed upon determination that the state of the power transmission control device has changed from the state in which a power transmission system is not established between the output shaft of the internal combustion engine and the output shaft of the manual transmission to the state in which the power transmission system is established therebetween in a state in which the magnitude of the motor torque is maintained at zero as a result of performance of the regeneration torque reduction control. The motor torque return control is performed such that the magnitude of the motor torque is maintained at zero for a second predetermined period, and then the motor torque is returned to the base motor torque. Preferably, the motor torque return control is started upon determination that the friction clutch has changed its engagement state from the completely disengaged state to a state other than the completely disengaged state in the state in which the magnitude of the motor torque is maintained at zero as a result of performance of the regeneration torque reduction control.

According to the present invention, when the clutch pedal is released (when the friction clutch enters a state other than the completely disengaged state) (or when the manual transmission enters the non-neutral state), the motor torque is maintained at zero for the second predetermined time, and then returned to the base motor torque. Accordingly, energy efficiency (fuel efficiency) is improved as compared with the case where transmission of the drive torque to the drive wheels is started immediately after the clutch pedal is released (the friction clutch enters a state other than the completely disengaged state) (or the manual transmission enters the non-neutral state) as mentioned above.

BRIEF DESCRIPTION OF THE DRAWINGS

FIG. 3 is a timing chart showing an example case where the regeneration torque reduction control and MG torque return control are performed by the device shown in FIG. 1.

MODE FOR CARRYING OUT THE INVENTION

Figure 1:
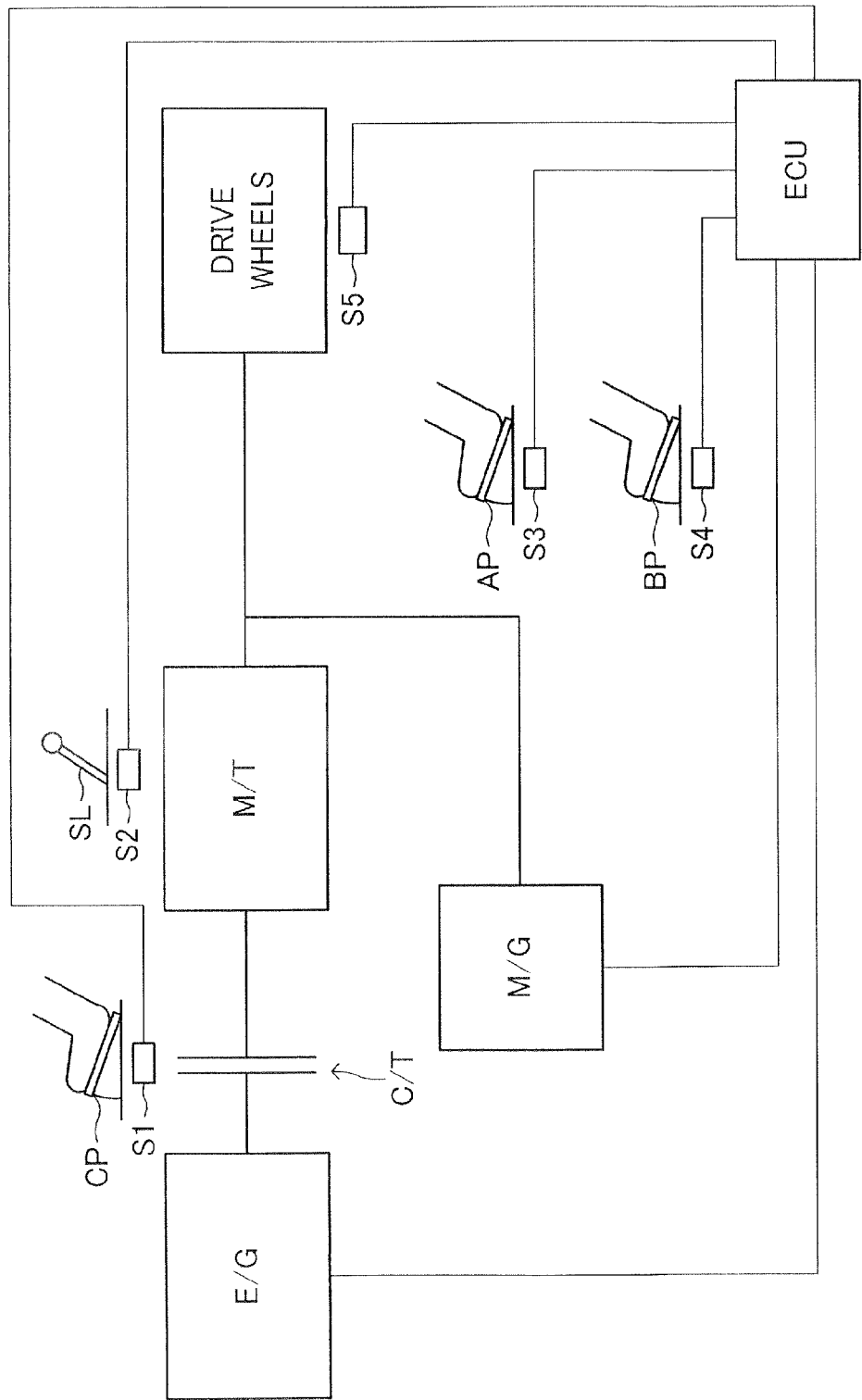
FIG. 1 is a schematic diagram of an HV-MT vehicle including a power transmission control device according to an embodiment of the present invention.

A power transmission control device for a vehicle according to an embodiment of the present invention will now be described with reference to the drawings.
(Structure)
FIG. 1 is a diagram schematically showing the configuration of a vehicle including a power transmission control device (hereinafter referred to as "the present device") according to an embodiment of the present invention. This vehicle is a hybrid vehicle which includes an engine E/G and a motor generator M/G as power sources, and includes a friction clutch C/T and a manual transmission M/T which does not include a torque converter. Namely, this vehicle is the above-described HV-MT vehicle.

The engine E/G is a well-known internal combustion engine, such as a gasoline engine which uses gasoline as fuel, or a diesel engine which uses light oil as fuel.

The manual transmission M/T is a transmission (a so-called manual transmission) which does not include a torque converter and whose gear stage is selected in accordance with the shift position of a shift lever SL operated by a driver. The manual transmission M/T has an input shaft which receives power from an output shaft of the engine E/G and an output shaft which outputs power to drive wheels of the vehicle. The manual transmission M/T has, for example, four forward gear stages (1-st to 4-th) and a single reverse gear stage (R). The manual transmission M/T has a neutral state. A "neutral state of the manual transmission M/T" refers to a state in which a power transmission system is not established between the input and output shafts of the manual transmission M/T. A "non-neutral state of the manual transmission M/T" refers to a state in which a power transmission system is established between the input and output shafts of the manual transmission M/T (specifically, a forward or backward gear stage is selected).

The gear stage of the manual transmission M/T may be mechanically selected (changed) in accordance with the shift position of the shift lever SL by making use of a link mechanism or the like which mechanically connects the shift lever SL to a sleeve (not shown) in the manual transmission M/T. Alternatively, the gear stage of the manual transmission M/T may be electrically selected (changed) (by a so-called by-wire scheme) by making use of drive force of an actuator which operates on the basis of the result of detection by a sensor for detecting the shift position of the shift lever SL (a sensor S2 which will be described later).

The friction clutch C/T is disposed between the output shaft of the engine E/G and the input shaft of the manual transmission M/T. The friction clutch C/T is a well-known clutch configured such that the engagement state of a friction plate (more specifically, the axial position of the friction plate, which rotates together with the input shaft of the manual transmission M/T, in relation to a flywheel, which rotates together with the output shaft of the engine E/G) changes depending upon an operation quantity (depression amount) of a clutch pedal CP operated by the driver.

The friction clutch C/T has three different engagement states; i.e., a completely engaged state, a half-engaged state, and a completely disengaged state. The completely engaged state refers to a state in which the friction clutch C/T transmits power without slippage. The half-engaged state refers to a state in which the friction clutch C/T transmits power with slippage. The completely disengaged state refers to a state in which the friction clutch C/T transmits no power. As the operation quantity (depression amount) of the clutch pedal CP increases, the friction clutch C/T changes its engagement state from the completely engaged state to the half-engaged state and then to the completely disengaged state.

The engagement state of the friction clutch C/T (the axial position of the friction plate) may be mechanically adjusted in accordance with the operation quantity of the clutch pedal CP by making use of a link mechanism or the like which mechanically connects the clutch pedal CP to the friction clutch C/T (the friction plate). Alternatively, the engagement state of the friction clutch C/T may be electrically adjusted (by a so-called by-wire scheme) by making use of the drive force of an actuator which operates on the basis of the result of detection by a sensor for detecting the operation quantity of the clutch pedal CP (a sensor S1 which will be described later).

The motor generator M/G has a well-known structure (e.g., an AC synchronous motor), and its rotor (not shown) rotates together with the output shaft thereof. The output shaft of the motor generator M/G is connected to the output shaft of the manual transmission M/T via a well-known gear train or the like in a power transmissible manner. In the following description, torque output from the output shaft of the engine E/G will be referred to as "EG torque," and torque output from the output shaft of the motor generator M/G as "MG torque."

The present device includes a clutch operation quantity sensor S1 which detects the operation quantity (depression amount, clutch stroke, etc.) of the clutch pedal CP, a shift position sensor S2 which detects the position of the shift lever SL, an accelerator operation quantity sensor S3 which detects the operation quantity (accelerator opening) of an accelerator pedal AP, a brake operation quantity sensor S4 which detects the operation quantity (depression force, presence/absence of operation, etc.) of a brake pedal BP, and a wheel speed sensor S5 which detects the speed of the wheels.

Moreover, the present device includes an electronic control unit (hereinafter simply referred to as the "ECU"). On the basis of information from the above-mentioned sensors S1 to S5 and other sensors, etc., the ECU controls the fuel injection amount of the engine E/G (the opening of its throttle valve) to thereby control the EG torque, and controls an inverter (not shown) to thereby control the MG torque.

Specifically, the ratio between the EG torque and the MG torque is adjusted on the basis of information from the above-mentioned sensors S1 to S5 and other sensors, etc. The magnitudes of the EG torque and MG torque are adjusted mainly on the accelerator opening. In particular, in this example, the MG torque is adjusted to a base MG torque when it is determined on the basis of the output from the sensor S1 that the friction clutch C/T is not in the completely disengaged state (i.e., is in the completely engaged state or the half-engaged state).

When the accelerator opening is equal to or greater than a predetermined value (>0), the base MG torque is torque (drive torque) acting in a direction for accelerating the vehicle. When the accelerator opening is less than the predetermined value, the base MG torque is torque (regeneration torque) acting in a direction for decelerating the vehicle. The magnitude of the base MG torque is determined on the basis of the accelerator opening. Specifically, when the base MG torque serves as the drive torque, the magnitude of the base MG torque increases from zero as the accelerator opening increases from the predetermined value. When the base MG torque serves as the regeneration torque, the magnitude of the base MG torque increases from zero as the accelerator opening decreases from the predetermined value toward zero. The predetermined value may be a fixed value or varied in accordance with the vehicle speed, etc. The predetermined value may be set to an optimum value in advance through an experiment, etc.

While generating the regeneration torque (>0), the motor generator M/G functions as a generator, thereby storing in a battery (not shown) the energy obtained as a result of electric power generation based on the regeneration torque. Meanwhile, while generating the drive torque (>0), the motor generator M/G functions as a motor, thereby consuming the energy stored in the battery (not shown) in order to generate the drive torque.

(Regeneration Torque Reduction Control and MG Torque Return Control)

As mentioned above, in the present device, the output shaft of the motor generator M/G is connected to the output shaft of the manual transmission MIT in a power transmissible manner. Accordingly, in a state where the clutch pedal CP is depressed to perform a shift operation, etc. (in periods during which the friction clutch C/T is in the completely disengaged state), torque (specifically, drive torque or regeneration torque) can be transmitted to the drive wheels by making use of the MG torque.

In contrast, in the case of a conventionally-known vehicle (the above-described ordinary MT vehicle) which includes a manual transmission and a friction clutch and which includes only an internal combustion engine as a power source, torque cannot be transmitted to the drive wheels by making use of the torque of the internal combustion engine in periods during which the friction clutch C/T is in the completely disengaged state.

There has been demand to render the drive feeling of the HV-MT vehicle identical (or similar) to the drive feeling of an ordinary MT vehicle. From the viewpoint of satisfaction of this demand, conceivably, it is preferred that in the present device, the MG torque be adjusted to zero (the MG torque is not transmitted to the drive wheels) in periods during which the friction clutch C/T is in the completely disengaged state.

Hereunder, this will be described with reference to FIG. 2. In an example shown in FIG. 2, before time t1, the friction clutch C/T is maintained in the completely engaged state. Also, before time t1, the MG torque (=the base MG torque) changes from the drive torque to the regeneration torque as a result of return of the accelerator opening to zero. In such a state where the friction clutch C/T is in the completely engaged state and the regeneration torque (=the base MG torque) based on the MG torque is generated, an operation of depressing the clutch pedal CP starts at time t1 in order to perform a shift operation, etc. After time t1, with the progress of the operation of depressing the clutch pedal CP, the friction clutch C/T changes its engagement state from the completely engaged state to the half-engaged state. After time t2 (see a point Q1), the friction clutch C/T is maintained in the completely disengaged state.

Figure 2:
FIG. 2 is a timing chart showing an example case where regeneration torque reduction control is performed by the device shown in FIG. 1.

In the example shown in FIG. 2, a conceivable method of realizing the above-described operation of "adjusting the MG torque to zero in periods during which the friction clutch C/T is in the completely disengaged state" is to adjust and maintain the magnitude of the regeneration torque as indicated by a broken line in FIG. 2. Specifically, in the conceivable method, immediately after time t2 when the friction clutch C/T enters the completely disengaged state, the magnitude of the regeneration torque is decreased from the magnitude of the base MG torque to zero and is maintained at zero.

However, in the case where the regeneration torque is adjusted to zero immediately after a point in time at which the friction clutch C/T enters the completely disengaged state as described above, the energy obtained as a result of electric power generation based on the regeneration torque becomes impossible to be stored in the battery immediately after that point in time. Accordingly, this is undesirable from the viewpoint of improvement of energy efficiency (improvement of fuel efficiency).

In order to overcome this drawback, in the present device, as indicated by a solid line in FIG. 2, after time t2, the magnitude of the regeneration torque is decreased from the magnitude of the base MG torque to a minute value A (>0) (see time t3), and then maintained at the minute value A. In the case where the completely disengaged state of the friction clutch C/T continues up to time t4 (until a predetermined time P1 elapses after time t3), after time t4, the magnitude of the regeneration torque is gradually decreased from the minute value A toward zero. After time t5 (after a predetermined time P2 has elapsed after time t4), the regeneration torque is maintained at zero. Notably, in the case where the magnitude of the regeneration torque is less than the minute value A before time t2, the magnitude of the regeneration torque may be maintained at a value "less than the minute value A" after time t2.

As a result, an additional amount of energy corresponding to the area shown by fine dots in FIG. 2 can be stored in the battery as compared with "the case where the magnitude of the regeneration torque is adjusted to zero immediately after time t2 (see the broken line in FIG. 2)." Namely, energy efficiency (fuel efficiency) is improved. Moreover, the drive feeling of the HV-MT vehicle becomes closer to the drive feeling of an ordinary MT vehicle as compared with the case where the magnitude of the regeneration torque is continuously maintained at the magnitude of the base MG torque even after the friction clutch C/T has entered the completely disengaged state. Namely, the present device can improve energy efficiency (fuel efficiency) while satisfying the demand to render the drive feeling of the HV-MT vehicle the same as the drive feeling of an ordinary MT vehicle.

The minute value A may be set to a greater value as the shift position of the shift lever SL becomes closer to the position corresponding to the 1-st gear stage (lowest gear stage), the vehicle speed increases, or the operation quantity (depression force) of the brake pedal BP increases. By virtue of this, the drive feeling can be improved further.

Notably, the predetermined time P1 or P2 may be increased as the shift position of the shift lever SL becomes closer to the position corresponding to the 1-st gear stage, the vehicle speed increases, or the operation quantity (depression force) of the brake pedal BP increases.

Next, another example will be described with reference to FIG. 3. The example shown in FIG. 3 is the same as the example shown in FIG. 2 up to a stage where the friction clutch C/T is maintained in the completely disengaged state after it has entered this state at time t2. In the example shown in FIG. 3, after that stage, the accelerator opening increases from zero and an operation of releasing the clutch pedal CP is performed. With the progress of the operation of releasing the clutch pedal CP, after time t7 (see a point Q2), the friction clutch C/T changes its engagement state from the completely disengaged state to the half-engaged state. After time t9, the friction clutch C/T is maintained in the completely engaged state. Notably, the accelerator opening is assumed to have already exceeded the above-described predetermined value at time t7 (i.e., the base MG torque has already been computed as the drive torque).

In the example shown in FIG. 3, conceivably, the above-described operation of "adjusting the MG torque to zero in periods during which the friction clutch C/T is in the completely disengaged state" is realized as follows. Specifically, immediately after time t2 when the friction clutch C/T enters the completely disengaged state, the magnitude of the regeneration torque is adjusted (decreased) from the magnitude of the base MG torque to zero and is maintained at zero as indicated by a broken line in FIG. 3. In addition, immediately after time t7 when the friction clutch C/T enters a state other than the completely disengaged state in the state in which the magnitude of the regeneration torque is adjusted to zero, the MG torque is returned to the base MG torque (=the drive torque >0) as indicated by a broken line in FIG. 3.

However, in the case where the regeneration torque is adjusted to zero immediately after a point in time at which the friction clutch C/T enters the completely disengaged state as described above, the energy obtained as a result of electric power generation based on the regeneration torque becomes impossible to be stored in the battery immediately after that point in time. Moreover, in the case where the MG torque is returned to the base MG torque immediately after a point in time at which the friction clutch C/T enters a state other than the completely disengaged state, consumption of the energy stored in the battery starts in order to generate the MG torque (drive torque) immediately after that point in time. These are undesirable from the viewpoint of improvement of energy efficiency (improvement of fuel efficiency).

In order to overcome this drawback, in the present device, as indicated by a solid line in FIG. 3, after time t2, the magnitude of the regeneration torque is maintained at the magnitude of the base MG torque up to time t6 (until a first predetermined period T1 elapses after time t2), and then the magnitude of the regeneration torque is adjusted to zero and is maintained at zero. Moreover, in the present device, as indicated by the solid line in FIG. 3, after time t7, the magnitude of the MG torque is maintained at zero up to time t8 (until a second predetermined period T2 elapses after time t7), and then the MG torque is returned to the base MG torque (=the drive torque >0).

As a result, an additional amount of energy corresponding to the left-hand area shown by fine dots in FIG. 3 can be stored in the battery as compared with "the case where the magnitude of the regeneration torque is adjusted to zero immediately after time t2 (see the broken line in FIG. 3)" as described above. In addition, energy consumption can be reduced by the amount corresponding to the right-hand area shown by fine dots in FIG. 3 as compared with "the case where the MG torque is returned to the base MG torque immediately after time t7 (see the broken line in FIG. 3)." Namely, energy efficiency (fuel efficiency) is improved. Moreover, the drive feeling of the HV-MT vehicle becomes closer to the drive feeling of an ordinary MT vehicle as compared with the case where the magnitude of the regeneration torque is continuously maintained at the magnitude of the base MG torque even after the friction clutch C/T enters the completely disengaged state. Namely, the present device can improve energy efficiency (fuel efficiency) while satisfying the demand to render the drive feeling of the HV-MT vehicle the same as the drive feeling of an ordinary MT vehicle.

A "point in time at which a change in the stroke (position of the friction plate) of the clutch from time t2 for complete disengagement becomes equal to a first stroke S1" may be used as time t6 instead of the above-described "point in time which comes after elapse of the first predetermined period T1 from time t2." Similarly, a "point in time at which a change in the stroke of the clutch from time t7 for complete engagement becomes equal to a second stroke S2" may be used as time t8 instead of the above-described "point in time which comes after elapse of the second predetermined period T2 from time t7."

The first predetermined period T1 (or the first stroke S1) may be increased as the shift position of the shift lever SL becomes closer to the position corresponding to the 1-st gear stage, the vehicle speed increases, or the operation quantity (depression force) of the brake pedal BP increases. By virtue of this, the drive feeling can be improved further.

The present invention is not limited to the above-described embodiment, and various modifications may be adopted without departing from the scope of the present invention. For example, in the above-described embodiment, the "state in which a power transmission system is established between the output shaft of the internal combustion engine and the output shaft of the manual transmission" is distinguished from the "state in which a power transmission system is not established between the output shaft of the internal combustion engine and the output shaft of the manual transmission" by determining "whether or not the friction clutch C/T is in the completely engaged state." These two states may be distinguished from each other by determining "whether or not the manual transmission M/T is in the neural state." In this case, a determination as to "whether or not the manual transmission M/T is in the neutral state" may be made on the basis of the result of detection by the shift position sensor S2.

Moreover, in the above-described embodiment, a determination as to "whether or not the friction clutch C/T is in the completely engaged state" is made on the basis of the result of detection by the clutch operation quantity sensor S1 which detects the operation quantity (stroke) of the clutch pedal CP. This determination may be made on the basis of the state of a switch which is held OFF when the operation quantity (stroke) of the clutch pedal CP is less than a predetermined quantity and which is held ON when the operation quantity (stroke) of the clutch pedal CP is equal to or greater than the predetermined quantity.

DESCRIPTION OF SYMBOLS

M/T: manual transmission
E/G: engine
C/T: clutch
M/G: motor generator
CP: clutch pedal
AP: accelerator peal
S1: clutch operation quantity sensor S2: shift position sensor
S3: accelerator operation quantity sensor
S4: brake operation quantity sensor
S5: wheel speed sensor
ECU: electronic control unit

The invention claimed is:

1. A power transmission control device for a vehicle which includes an internal combustion engine and an electric motor as power sources, comprising:
   a manual transmission which has an input shaft for receiving power from an output shaft of the internal combustion engine and an output shaft for outputting power to drive wheels of the vehicle, which does not have a torque converter, and whose gear state is selected in accordance with a shift position of a shift operation member operated by a driver, an output shaft of the electric motor being connected to the output shaft of the manual transmission;
   a friction clutch which is interposed between the output shaft of the internal combustion engine and the input shaft of the manual transmission and whose engagement state changes in accordance with an operation quantity of a clutch operation member operated by the driver;
   first detection means which detects an operation quantity of an acceleration operation member operated by the driver in order to accelerate the vehicle;
   second detection means which detects operation of the clutch operation member; and
   control means which controls internal combustion engine torque which is torque output from the output shaft of the internal combustion engine and motor torque which is torque output from the output shaft of the electric motor, wherein
   the control means adjusts the motor torque to a base motor torque when it is determined that a power transmission system is established between the output shaft of the internal combustion engine and the output shaft of the manual transmission, the base motor torque having a magnitude determined in accordance with the operation quantity of the acceleration operation member, serving as drive torque acting in a direction for accelerating the vehicle when the operation quantity of the acceleration operation member is equal to or greater than a predetermined quantity, and serving as regeneration torque acting in a direction for decelerating the vehicle when the operation quantity of the acceleration operation member is less than the predetermined quantity; and
   the control means executes a regeneration torque reduction control in which the magnitude of the motor torque serving as the regeneration torque is decreased from the magnitude of the base motor torque to a predetermined minute value which is greater than zero and then the magnitude of the motor torque is maintained at the minute value, upon determination that the motor torque is adjusted to the base motor torque serving as the regeneration torque and the state of the power transmission control device has changed from a state in which a power transmission system is established between the output shaft of the internal combustion engine and the output shaft of the manual transmission to a state in which the power transmission system is not established therebetween.

2. A power transmission control device for a vehicle according to claim 1, wherein the control means starts the regeneration torque reduction control upon determination that the motor torque is adjusted to the base motor torque serving as the regeneration torque and the friction clutch has changed its engagement state from a state other than a completely disengaged state to the completely disengaged state.

3. A power transmission control device for a vehicle according to claim 2, wherein the control means gradually decreases the magnitude of the motor torque serving as the regeneration torque from the minute value toward zero upon determination that the completely disengaged state of the friction clutch continued for a predetermined time after start of the regeneration torque reduction control in the state in which the magnitude of the motor torque serving as the regeneration torque is maintained at the minute value as a result of performance of the regeneration torque reduction control.

4. A power transmission control device for a vehicle according to claim 1, wherein the control means sets the minute value to a greater value as the shift position of the shift operation member becomes closer to the position corresponding to the lowest gear stage, the vehicle speed increases, or the operation quantity of a deceleration operation member operated by the driver in order to decelerate the vehicle increases.

5. A power transmission control device for a vehicle which includes an internal combustion engine and an electric motor as power sources, comprising:
   a manual transmission which has an input shaft for receiving power from an output shaft of the internal combustion engine and an output shaft for outputting power to drive wheels of the vehicle, which does not have a torque converter, and whose gear state is selected in accordance with a shift position of a shift operation member operated by a driver, an output shaft of the electric motor being connected to the output shaft of the manual transmission;
   a friction clutch which is interposed between the output shaft of the internal combustion engine and the input shaft of the manual transmission and whose engagement state changes in accordance with an operation quantity of a clutch operation member operated by the driver;
   first detection means which detects an operation quantity of an acceleration operation member operated by the driver in order to accelerate the vehicle;
   second detection means which detects operation of the clutch operation member; and
   control means which controls internal combustion engine torque which is torque output from the output shaft of the internal combustion engine and motor torque which is torque output from the output shaft of the electric motor, wherein
   the control means adjusts the motor torque to a base motor torque when it is determined that a power transmission system is established between the output shaft of the internal combustion engine and the output shaft of the manual transmission, the base motor torque having a magnitude determined in accordance with the operation quantity of the acceleration operation member, serving as drive torque acting in a direction for accelerating the vehicle when the operation quantity of the acceleration operation member is equal to or greater than a predetermined quantity, and serving as regeneration torque acting in a direction for decelerating the vehicle when the operation quantity of the acceleration operation member is less than the predetermined quantity; and
   the control means maintains the magnitude of the motor torque serving as the regeneration torque at the magnitude of the base motor torque for a first predetermined period, and then decreases it zero upon determination that the motor torque is adjusted to the base motor torque serving as the regeneration torque and the state of the power transmission control device has changed from a state in which a power transmission system is established between the output shaft of the internal combustion engine and the output shaft of the manual transmission to a state in which the power transmission system is not established therebetween.

6. A power transmission control device for a vehicle which includes an internal combustion engine and an electric motor as power sources, comprising:
   a manual transmission which has an input shaft for receiving power from an output shaft of the internal combustion engine and an output shaft for outputting power to drive wheels of the vehicle, which does not have a torque converter, and whose gear state is selected in accordance with a shift position of a shift operation member operated by a driver, an output shaft of the electric motor being connected to the output shaft of the manual transmission;
   a friction clutch which is interposed between the output shaft of the internal combustion engine and the input shaft of the manual transmission and whose engagement state changes in accordance with an operation quantity of a clutch operation member operated by the driver;
   first detection means which detects an operation quantity of an acceleration operation member operated by the driver in order to accelerate the vehicle;
   second detection means which detects operation of the clutch operation member; and
   control means which controls internal combustion engine torque which is torque output from the output shaft of the internal combustion engine and motor torque which is torque output from the output shaft of the electric motor, wherein
   the control means adjusts the motor torque to a base motor torque when it is determined that a power transmission system is established between the output shaft of the internal combustion engine and the output shaft of the manual transmission, the base motor torque having a magnitude determined in accordance with the operation quantity of the acceleration operation member, serving as drive torque acting in a direction for accelerating the vehicle when the operation quantity of the acceleration operation member is equal to or greater than a predetermined quantity, and serving as regeneration torque acting in a direction for decelerating the vehicle when the operation quantity of the acceleration operation member is less than the predetermined quantity; and
   the control means executes a regeneration torque reduction control in which the magnitude of the motor torque serving as the regeneration torque is decreased from the magnitude of the base motor torque to zero upon determination that the motor torque is adjusted to the base motor torque serving as the regeneration torque and the state of the power transmission control device has changed from a state in which a power transmission system is established between the output shaft of the internal combustion engine and the output shaft of the manual transmission to a state in which the power transmission system is not established therebetween, and
   executes a motor torque return control in which the magnitude of the motor torque is maintained at zero for a second predetermined period and then the motor torque is returned to the base motor torque, upon determination that the state of the power transmission control device has changed from the state in which a power transmission system is not established between the output shaft of the internal combustion engine and the output shaft of the manual transmission to the state in which the power transmission system is established therebetween in a state in which the magnitude of the motor torque is maintained at zero as a result of performance of the regeneration torque reduction control.

7. A power transmission control device for a vehicle according to claim 5, wherein the control means starts the regeneration torque reduction control upon determination that the motor torque is adjusted to the base motor torque serving as the regeneration torque and the friction clutch has changed its engagement state from a state other than a completely disengaged state to the completely disengaged state.

8. A power transmission control device for a vehicle according to claim 6, wherein the control means starts the motor torque return control upon determination that the friction clutch has changed its engagement state from the completely disengaged state to a state other than the completely disengaged state in the state in which the magnitude of the motor torque is maintained at zero as a result of performance of the regeneration torque reduction control.

9. A power transmission control device for a vehicle according to claim 6, wherein the control means starts the regeneration torque reduction control upon determination that the motor torque is adjusted to the base motor torque serving as the regeneration torque and the friction clutch has changed its engagement state from a state other than a completely disengaged state to the completely disengaged state.

\* \* \* \* \*